March 3, 1970  H. A. SOULANT  3,498,124
APPARATUS FOR MEASURING TENSION IN A RUNNING
LINE OF MAGNETIC MATERIAL
Filed Dec. 26, 1967

INVENTOR
HERMAN A. SOULANT

BY
*O. D. Hodges*
ATTORNEY

United States Patent Office 3,498,124
Patented Mar. 3, 1970

3,498,124
APPARATUS FOR MEASURING TENSION IN A RUNNING LINE OF MAGNETIC MATERIAL
Herman A. Soulant, Montgomery County, Md., assignor to the United States of America as represented by the Secretary of the Navy
Filed Dec. 26, 1967, Ser. No. 693,396
Int. Cl. G01l 5/10
U.S. Cl. 73—143        7 Claims

ABSTRACT OF THE DISCLOSURE

A device for measuring tension in a magnetically conductive member which provides for generation of a magnetic field around the member and a pickup magnetically coupled to the member. The output of the pickup is directly proportional to the tension in the member coupling the magnetic field to the pickup.

The invention described herein may be manufactured and used by or for the Government of the United States of America for governmental purposes without the payment of any royalties thereon or therefor.

BACKGROUND OF THE INVENTION

This invention relates to devices for measuring tension in a magnetically conductive member and more specifically measurement of tension in metallic cables.

Devices of this type are required when a structural member is subjected to varying loads which may exceed the tensile strength of the member. Continuous monitoring of the stress in the member prevents overload and the possible eventual fracture of the member.

The prior art devices have required physical attachment of the measuring device to the member and thus prevent measurement in a running cable and restrict the points at which measurement can be made. One such device establishes a predetermined deflection in the cable and measures tension by determining the force required to maintain the predetermined deflection. Another type of prior art device determines tension in the cable by measuring the change in resonant frequency with tension. In addition to the restriction to the above, these devices are generally large and heavy and require complex electronics for the measurement.

The present device provides a means for measuring tension in the cable without physical attachment thereto. This device determines the tension in a cable by measuring the change in magnetic conductivity of the cable as a function of the stress induced in the cable.

SUMMARY

The invention described herein provides a separable, two-piece housing which may be assembled around the cable at any point and provides a passage through which the cable may freely run. The housing is provided with a coil for generating an alternating current magnetic field and a second coil with pickup means for determining the magnetic field induced therein. The housing is constructed such that the cable passes through these coils and provides a magnetic path between the coils. As the stress in the cable changes its magnetic conduction is varied in direct proportion to the stress. Thus, by measuring the change in voltage induced in the pickup coil, a direct measurement of the stress in the running cable is provided. The device require only elementary electronic components and simple mechanical construction. It can be installed at any convenient point on the cable and is sufficiently small and light to allow it to be readily portable.

Thus there is provided in this invention a small and simply constructed device for measuring tension in a running cable without physical attachment thereto or other restrictions on its operation. It is, therefore, an object of this invention to provide a simple portable device for measuring tension in a magnetically conductive member.

Another object of the invention is to provide a device for measuring tension in a moving member.

A further object of the device is to provide a simple and portable instrument for measurement of tension in a running cable.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
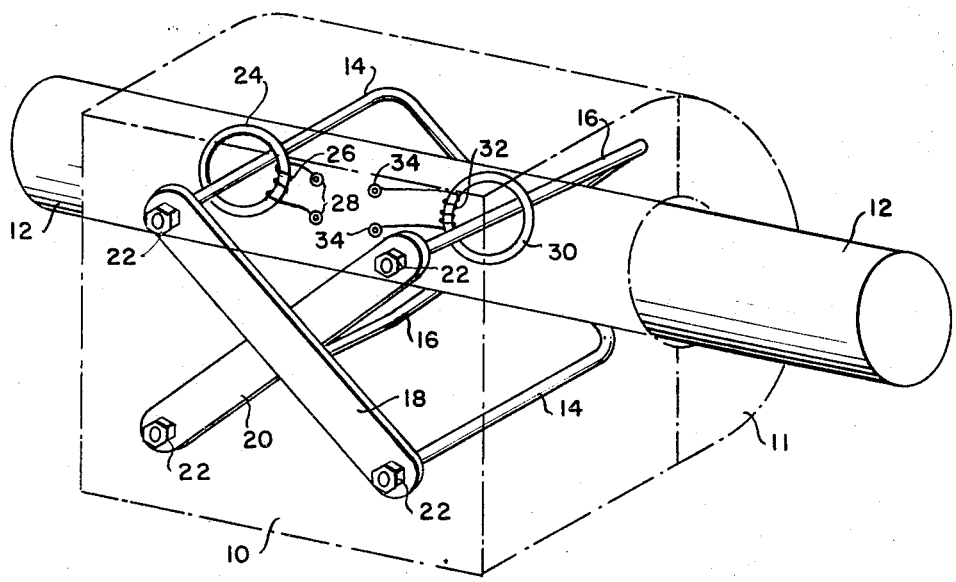
FIG. 1 is a perspective view of the device assembled around the cable.

Referring now to the drawings, there is shown in FIG. 1 an isometric view of the device assembled around a running cable. The housing, which is of a non-magnetic material, is made of two separable halves designated 10 and 11. Each half of the housing has a semi-circular channel running along one face thereof. The housing is assembled with these channels in register thus forming a circular passage through the device. The two halves of the housing are fastened together by means of two U-shaped elements 14 and 16. The legs of these elements are inserted in holes provided in section 11 of the housing, extend through section 10 of the housing and protrude through holes in the outer face thereof and in register with the holes in section 11. The legs of each U-shaped member are connected together by bars 18 and 20. These bars may be fastened to the legs in any conventional manner. As shown in FIG. 1, there is provided on the ends of each leg a threaded portion by which the bars are fastened with nuts 22.

One leg of each of the U-shaped members is passed through a toroidal core. Core 24 and its associated winding 26 is provided for member 14 and core 30 with its winding 32 is provided for member 16. The ends of the toroidal windings are connected to electrical terminals shown at 28 and 34. The U-shaped members and their associated fastening bars perform dual functions in the device. They serve as a means for fastening the two housing halves together as described above and also serve as single turn coils in the measuring electronics which is described below.

Figure 2:
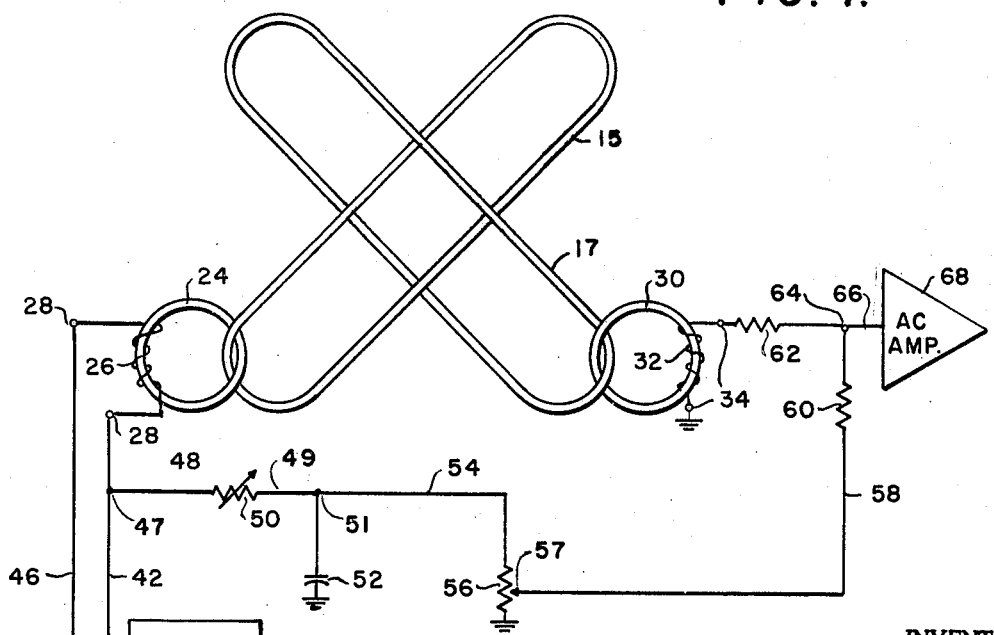
FIG. 2 is an electrical schematic of the invention.

Referring now to FIG. 2, there is shown an electrical schematic of the device. An oscillator 40 provides a source of alternating current which is connected to the ends of toroid winding 26 at terminals 28 by means of leads 46 and 42. The U-shaped member 14 and its associated bar 18 shown in FIG. 1 and described above form a single turn coil designated 15 which passes through the toroidal core 24. A second single turn coil 17 is formed by U-shaped member 16 and its associated bar 20. The planes of the coils are arranged 90° from each other and are each at a 45° angle to the passage through the housing described above. Coil 16 passes through the toroid composed of core 30 and its winding 32. One end of toroid winding 32 is connected to resistor 62 and the other end to ground.

The output lead 42 from oscillator 40 is provided with a junction point 47 between the oscillator and terminal 28 of the first toroidal winding. A lead 48 is connected to junction point 47 at one end and to a variable resistor 50 at the other end. The other end of variable resistor 50 is connected to junction point 51 through a lead 49. A capacitor 52 is connected at one end at junction point 50 and at the other end to ground. A lead 54 connects junction point 50 with one end of a potentiometer 56 with the other end of the potentiometer connected to ground. A wiper 57 of potentiometer 56 is connected to one end of resistor 60 through lead 58. The other end of resistor 60 is connected at junction point 64 with the other end of resistor 62. Junction point 64 is then connected to an output amplifier 68.

DESCRIPTION OF THE OPERATION

The housing is assembled around the cable in which tension is to be measured as described in connection with FIG. 1 above. With the oscillator 40 energized the toroidal winding 26 and its core 24 generates a magnetic field which induces current flow in single turn coil 15 thereby generating a magnetic field around the cable 12. A portion of the generated magnetic field is conducted through cable 12 and is received by single turn coil 16. Current induced in coil 16 generates an output voltage in toroid coil 32. The magnetic conductivity of the cable 12 varies as the applied tension in the cable varies. Thus the voltage in output coil 34 varies proportionally with the tension in the cable. Since the voltage change caused by tension variation in the cable is small in relation to the total voltage induced in coil 32, there is provided a means for subtracting from the output a voltage equal to the output voltage of coil 32 when the housing is assembled around the cable and there is no load applied to the cable. This subtraction is accomplished by deriving a signal from oscillator 40 which is equal in amplitude and opposite in phase to the no-load output signal from coil 32. Variable resistor 50 and capacitor 52 provide a means for phase adjustment while potentiometer 56 and its associated wiper 57 provide amplitude adjustment for zeroing the output under no-load conditions. It can be seen that the input to amplifier 68 is simply the voltage change induced in coil 32 due to the tension in the cable.

Thus it can be seen that there is herein provided a simple portable device for measuring tension in a cable without physical attachment thereto, providing great flexibility in the location of the device without impeding operation of the cable.

While the system has been described in its preferred embodiment as usable in measuring tension in a cable it will be obvious to those skilled in the art that the device may be used to measure stress in any structural member where continuous monitoring of stress conditions is required.

Obviously many modifications and variations of the present invention are possible in the light of the above teachings. It is, therefore, to be understood that the invention may be practiced otherwise than as specifically described.

What is claimed is:

1. Apparatus for measuring stress in a magnetically conductive member comprising:
   a housing of non-magnetic material having an opening for passage of said magnetically conductive member therethrough;
   a source of alternating electric current;
   generating means for generating a magnetic field surrounding said opening, said generating means including a primary coil connected to said source of alternating electric current and a field generating coil passing through said primary coil and surrounding said opening, said field generating coil lying in a plane at an angle to the axis of said opening;
   magnetic receiving means magnetically coupled to said generating means through said magnetically conductive member;
   pick-off means magnetically coupled to said receiving means for measuring the magnetic field in said receiving means whereby the output of said pick-off means is related to the stress in said magnetically conductive member.

2. Apparatus for measuring stress in a magnetically conductive member according to claim 1 wherein said magnetic receiving means comprises:
   a receiving coil surrounding said opening and lying in a plane intersecting the plane of said field generating coil and lying at an angle thereto.

3. Apparatus for measuring stress in a magnetically conductive member according to claim 2 wherein said pick-off means comprises:
   an output coil through which said receiving coil passes, the output of said output coil being related to the current in said receiving coil.

4. Apparatus for measuring stress in a magnetically conductive member according to claim 1 wherein said housing comprises:
   a first housing section having a channel of semi-circular cross section along one surface thereof;
   a second housing section having a semi-circular channel on one face thereof substantially identical to said channel of said first section;
   said field generating coil and said magnetic receiving means mechanically coupling said first section to said second section in such a fashion that said semi-circular channels form a circular opening through said coupled sections.

5. Apparatus for measuring stress in a magnetically conductive member according to claim 4, wherein said field generating coil and said magnetic receiving means include:
   first and second U-shaped members, the legs of said U shaped members being inserted through said first and second housing sections and protruding through the outside surface of one of said sections, said U shaped members being assembled in said first and second housing sections in such a fashion that the legs of each of said U shaped members lie on opposite sides of said opening and the U-shaped members lie in different intersecting planes;
   first and second connecting bars, each of said connecting bars connecting the legs of one of said U-shaped members; and
   means for fastening said connecting bars to said U-shaped members outside of said housing.

6. Apparatus for measuring stress in a magnetically conductive member according to claim 5 wherein said primary coil comprises:
   a toroid encircling one of the legs of said first U-shaped member, the winding of said toroid being connected to said source of alternating electric current, wherein said field generating coil comprises said first U-shaped member and said first connecting bar thereby forming a single turn coil magnetically coupled to said toroid.

7. Apparatus for measuring stress in a magnetically conductive member according to claim 6 wherein said magnetic receiving means comprises said second U-shaped member and said second connecting bar thereby forming a single turn electrical coil magnetically coupled to said generating means through said magnetically conductive member and said pick-off means comprises a toroid encircling one of the legs of said second U-shaped member and magnetically coupled thereto whereby the output of said toroid is proportional to the current induced in said second U-shaped member.

References Cited

UNITED STATES PATENTS

| | | |
|---|---|---|
| 1,906,551 | 5/1933 | De Forest. |
| 3,011,340 | 12/1961 | Dahel _____ 73—136 |
| 3,311,818 | 3/1967 | Quittner _____ 324—34 |
| 3,319,464 | 5/1967 | Bender _____ 73—136 |

FOREIGN PATENTS 849,360  9/1960  Great Britain.

CHARLES A. RUEHL, Primary Examiner

U.S. Cl. X.R.

324—34.1; 336—20